F. M. ASHLEY.
INKSTAND.
APPLICATION FILED NOV. 30, 1906.
960,770.
Patented June 7, 1910.
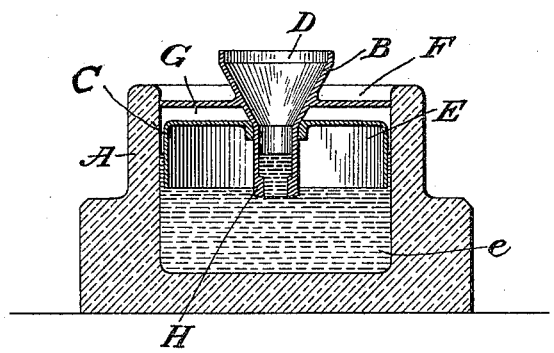
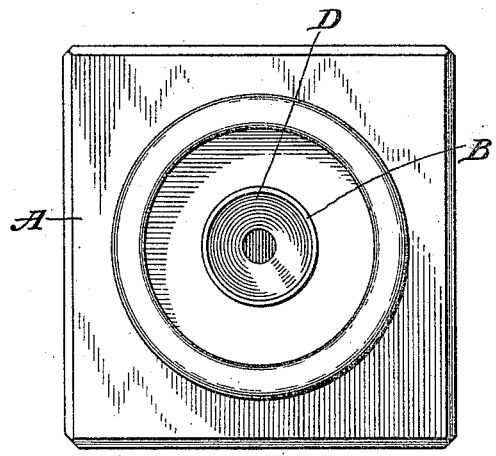
Witnesses
Chas. J. Clagett
N. E. Miller
Inventor
Frank M. Ashley

UNITED STATES PATENT OFFICE.

FRANK M. ASHLEY, OF NEW YORK, N. Y.

INKSTAND.

960,770.  Specification of Letters Patent.  Patented June 7, 1910.

Application filed November 30, 1906. Serial No. 345,663.

*To all whom it may concern:*

Be it known that I, FRANK M. ASHLEY, a citizen of the United States, residing at West Sixth street, corner Dewey avenue, in the city of New York, borough of Brooklyn, Coney Island, State of New York, have invented certain new and useful Improvements in Inkstands, of which the following is a specification.

The present invention relates to inkstands and the object of the invention is to provide an inkstand of the automatic type of practically two parts, a base part containing the well for the ink, and a float which telescopes in the well and rests in the ink therein.

The new feature of improvement resides in the form and construction of the float and its fit in the well.

Referring to the drawings which form part of this specification,—Figure 1, is a vertical sectional view of my improved stand. Fig. 2, is a plan view of the stand illustrated in Fig. 1.

A, indicates the body of the stand having a well e, in which is fitted loosely a float C, provided with a dip tube B and cover F, formed integral therewith.

E, indicates the air space of the float, and H indicates the lower end of the dip tube which extends slightly lower than the depending side walls, so that it will strike the bottom before the side wall strikes the curved bottom at the sides of the well, to prevent the sticking of the float at this point.

G, indicates a space between the top of the float and cover F, and receives the overflow of ink which may be forced from the well past the wall of the float. The cover F is of sufficient diameter to contact with the side of the well and serve as a guide for the movement of the float. The diameter of the float is such as to move freely in the well without actual contact with the side wall of the well, but sufficiently close to form a restricted passage there between. The opening through the stem H is fairly large to permit the ink to flow freely to the dip D of the float. The ink is forced to the dip cup by displacement of the float and since the float is not a tight sliding fit in the reservoir, ink will flow to dip D easier if the passage is fairly large, and less ink will be forced to the overflow chamber. The depth of the well is about twice that of the length of the float, and the dip cup extends above the cover and is of sufficiently less diameter than the well to permit of using same as a handle to lift the float from the well when the well is empty without soiling the fingers by contact with the side wall of the well. The float is preferably made in two parts as shown, the cover and dip tube being formed integral and secured to the float portion as illustrated. As the ink is used up, the float rests lower in the well. The well is open at the top and the float and cover are approximately of the same diameter, the cover being slightly the greater.

In operation, assuming ink to be in the well as illustrated, the float is depressed by a pen, thus causing the ink to flow to the dip tube and a portion to the overflow chamber G. When the pressure is removed, the float rises and the ink returns from the dip and overflow chamber to the well below the float.

By this construction I am enabled to construct an inkstand of two parts, a float and a body portion having a well; and of extreme simplicity and utility.

Having thus described my invention, what I claim as new and desire to secure by Letters Patent, is—

1. An inkstand comprising two parts, a base having a cylindrical reservoir entirely open at the top, and a float of nearly the same diameter as the reservoir provided with an annular recess which serves as an overflow chamber, the upper part of the float constituting a cover for the reservoir, and extending nearly to the inner wall thereof.

2. A two-part inkstand comprising a base having a cylindrical reservoir entirely open at the top, and a float carrying a dip cup and cover in fixed relation to said float, a recess to serve as an overflow chamber, the diameter of the float being nearly that of the reservoir, and its length being less than the depth of the well.

3. A two part inkstand comprising a base having a cylindrical reservoir open its full diameter at the top, and a float having a cover of greater diameter than the lower end of the float and adapted to slidingly engage the walls of the reservoir, said float having an annular recess which serves as an overflow chamber as set forth.

4. A two part inkstand comprising a base having a cylindrical reservoir open its full diameter at the top, and a float of less length than the depth of the reservoir, said float having an annular recess which serves as an overflow chamber, and having a cover connected thereto, which extends to the wall of the reservoir to serve as a guide.

5. A two part inkstand comprising a base having a cylindrical reservoir open its full diameter at its top, and a float provided with a cover portion which extends nearly to the inner wall of the reservoir, said float having a recess which serves as an overflow chamber, said float being of less length than the depth of said reservoir and of approximately the same lateral dimensions, and having a dip cup located on the top thereof.

6. A two part inkstand having a base provided with a cylindrical reservoir entirely open at the top, and a float having an air chamber at its lower end and a cover portion at its upper end, and an annular recess formed between said air chamber and said cover and serving as an overflow chamber, said cover portion extending sufficiently to cover the float portion.

7. A two part inkstand comprising a base having a cylindrical reservoir entirely open at the top, and a float having an air chamber at its lower end and a cover portion at its upper end which extends entirely over said float, an annular recess being formed between said air chamber and cover, and a dip cup which extends above the cover.

8. A two-part inkstand comprising a base portion having a vertical cylindrical reservoir, and a float consisting of a circular floating element which supports a disk cover and a dip tube which are located above the said element and form between said disk and floating element, an overflow chamber into which ink may flow from the reservoir when the float is depressed.

In testimony whereof I, FRANK M. ASHLEY, have signed my name to this specification in the presence of two subscribing witnesses, this twenty-seventh day of November, 1906.

FRANK M. ASHLEY.

Witnesses:
AMELIA BLAUVELT,
N. C. MILLER.